United States Patent
Alhamoud

(10) Patent No.: US 12,553,521 B1
(45) Date of Patent: Feb. 17, 2026

(54) SEAL GAS CONTAMINATION DETECTION AND SEAL GAS SUPPLY SWITCHOVER SYSTEM

(71) Applicant: SAUDI ARABIAN OIL COMPANY, Dhahran (SA)

(72) Inventor: Abdulaziz S. Alhamoud, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/039,163

(22) Filed: Jan. 28, 2025

(51) Int. Cl.
*F16J 15/40* (2006.01)
*F04D 29/12* (2006.01)

(52) U.S. Cl.
CPC ............. *F16J 15/40* (2013.01); *F04D 29/124* (2013.01)

(58) Field of Classification Search
CPC ...... F04D 29/124; F16J 15/3492; F16J 15/40; F16J 15/3404
See application file for complete search history.

(56) References Cited

U.S. PATENT DOCUMENTS

| | | | | |
|---|---|---|---|---|
| 4,993,917 A * | 2/1991 | Kulle | ............... | F01D 3/04 415/105 |
| 6,345,954 B1 * | 2/2002 | Al-Himyary | ........ | F16J 15/3404 415/230 |
| 6,524,059 B1 * | 2/2003 | Nogiwa | ............... | F16J 15/3492 415/113 |
| 6,715,985 B2 * | 4/2004 | Delrahim | ............... | F04D 29/124 415/26 |
| 6,802,689 B2 * | 10/2004 | Nogiwa | ............... | F04D 27/0292 415/113 |
| 7,854,587 B2 * | 12/2010 | Ito | ......... | F04D 29/124 415/168.2 |
| 9,145,783 B2 | 9/2015 | Delrahim et al. | | |
| 9,790,952 B2 | 10/2017 | Shamseldin et al. | | |
| 10,563,663 B2 * | 2/2020 | Garceau | ................. | F01D 11/06 |
| 10,738,641 B2 | 8/2020 | Gerbi et al. | | |
| 2002/0197154 A1 * | 12/2002 | Nogiwa | ............... | F04D 27/0292 415/168.2 |
| 2003/0215324 A1 * | 11/2003 | Delrahim | ............... | F04D 29/124 415/26 |

(Continued)

FOREIGN PATENT DOCUMENTS

| | | |
|---|---|---|
| CN | 111256920 A | 6/2020 |
| GB | 2596406 A | 12/2021 |
| WO | 1997001053 A1 | 1/1997 |

*Primary Examiner* — Eldon T Brockman
(74) *Attorney, Agent, or Firm* — Osha Bergman Watanabe & Burton LLP

(57) ABSTRACT

A system includes a seal gas (comprising a first gas or a second gas), a seal gas inlet pipe, a first seal gas supply system, a second seal gas supply system, and a computer processor. The first seal gas supply system comprises a first seal gas supply line configured to transport the first gas from a first seal gas supply to the seal gas inlet pipe, a first solenoid valve, and a first CPC sensor configured to measure a particle count in the first gas. The second seal gas supply system comprises a second seal gas supply line configured to transport the second gas from a second seal gas supply to the seal gas inlet pipe, and a second solenoid valve. The computer processor is coupled to the first CPC sensor, the first solenoid valve, and the second solenoid valve.

20 Claims, 5 Drawing Sheets

(56) References Cited

U.S. PATENT DOCUMENTS

| | | | |
|---|---|---|---|
| 2007/0147988 A1* | 6/2007 | Ito | F01D 11/04 |
| | | | 415/169.1 |
| 2013/0170961 A1* | 7/2013 | Meucci | F16J 15/3484 |
| | | | 415/170.1 |
| 2019/0309765 A1* | 10/2019 | Garceau | F04D 27/02 |

* cited by examiner

SEAL GAS CONTAMINATION DETECTION AND SEAL GAS SUPPLY SWITCHOVER SYSTEM

BACKGROUND

Seals are relatively easy to maintain between two stationary components, but in many types of rotating equipment, like gas compressors or fluid pumps, seals must be formed between parts in motion—an inherently more challenging task with conventional sealing technologies. Gas seals are effective seals for rotating equipment because they use a thin film of pressurized gas to create a barrier between sealing faces which allows the parts to move, prevents process gas leakage, and reduces wear and tear. However, gas seals fail when the supply gas that is used to create the gas seal becomes contaminated with liquid and/or particulates. When a gas seal fails, large volumes of process fluid may leak into the atmosphere causing harm to people and the environment and causing prolonged shutdown of vital systems. As such, the ability to provide only contaminate-free gas to a gas seal in rotating equipment is beneficial.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for sealing a rotating apparatus. The system includes a seal gas, a seal gas inlet pipe, a first seal gas supply system, a second seal gas supply system, and a computer processor. The seal gas is configured to create a seal in the rotating apparatus. The seal gas comprises a first gas or a second gas. The seal gas inlet pipe is configured to transport the seal gas to the rotating apparatus. The first seal gas supply system comprises a first seal gas supply line configured to transport the first gas from a first seal gas supply to the seal gas inlet pipe, a first solenoid valve coupled to the first seal gas supply line and having an open position and a closed position, wherein the open position hydraulically connects the first seal gas supply line to the seal gas inlet pipe, and a first CPC sensor configured to measure a particle count in the first gas. The second seal gas supply system comprises a second seal gas supply line configured to transport the second gas from a second seal gas supply to the seal gas inlet pipe, and a second solenoid valve coupled to the second seal gas supply line and having an open position and a closed position, wherein the open position hydraulically connects the second seal gas supply line to the seal gas inlet pipe. The computer processor is coupled to the first CPC sensor, the first solenoid valve, and the second solenoid valve. The computer processor is configured to send a signal to the first solenoid valve to place the first solenoid valve in the closed position and send a signal to the second solenoid valve to place the second solenoid valve in the open position when the first CPC sensor detects the particle count in the first gas being higher than a predetermined value.

The method includes pumping a seal gas to create a seal in the rotating apparatus using a seal gas inlet pipe, wherein the seal gas comprises a first gas or a second gas; connecting a first seal gas supply system to the seal gas inlet pipe, wherein the first seal gas supply system comprises a first seal gas supply line configured to transport the first gas from a first seal gas supply to the seal gas inlet pipe, a first solenoid valve coupled to the first seal gas supply line, and a first CPC sensor; and connecting a second seal gas supply system to the seal gas inlet pipe, wherein the second seal gas supply system comprises a second seal gas supply line configured to transport the second gas from a second seal gas supply to the seal gas inlet pipe, and a second solenoid valve coupled to the second seal gas supply line. The method further includes opening the first solenoid valve to flow the first gas from the first seal gas supply line to the seal gas inlet pipe; measuring a particle count in the first gas using the first CPC sensor; and closing the first solenoid valve and opening the second solenoid valve to flow the second gas from the second seal gas supply line to the seal gas inlet pipe when the particle count of the first gas is higher than a predetermined value.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As outlined above, gas seals are effective means for preventing process fluid leakage in rotating equipment. However, it is important that the gas supply used to create the gas seal is contaminant free before it creates the gas seal in the rotating equipment. As such, the present invention outlines a gas supply system that uses a series of sensors and automatically-actuated valves to switch from a contaminated gas to a clean gas to provide contaminant-free seal gas to a gas seal in a rotating apparatus.

Figure 1:
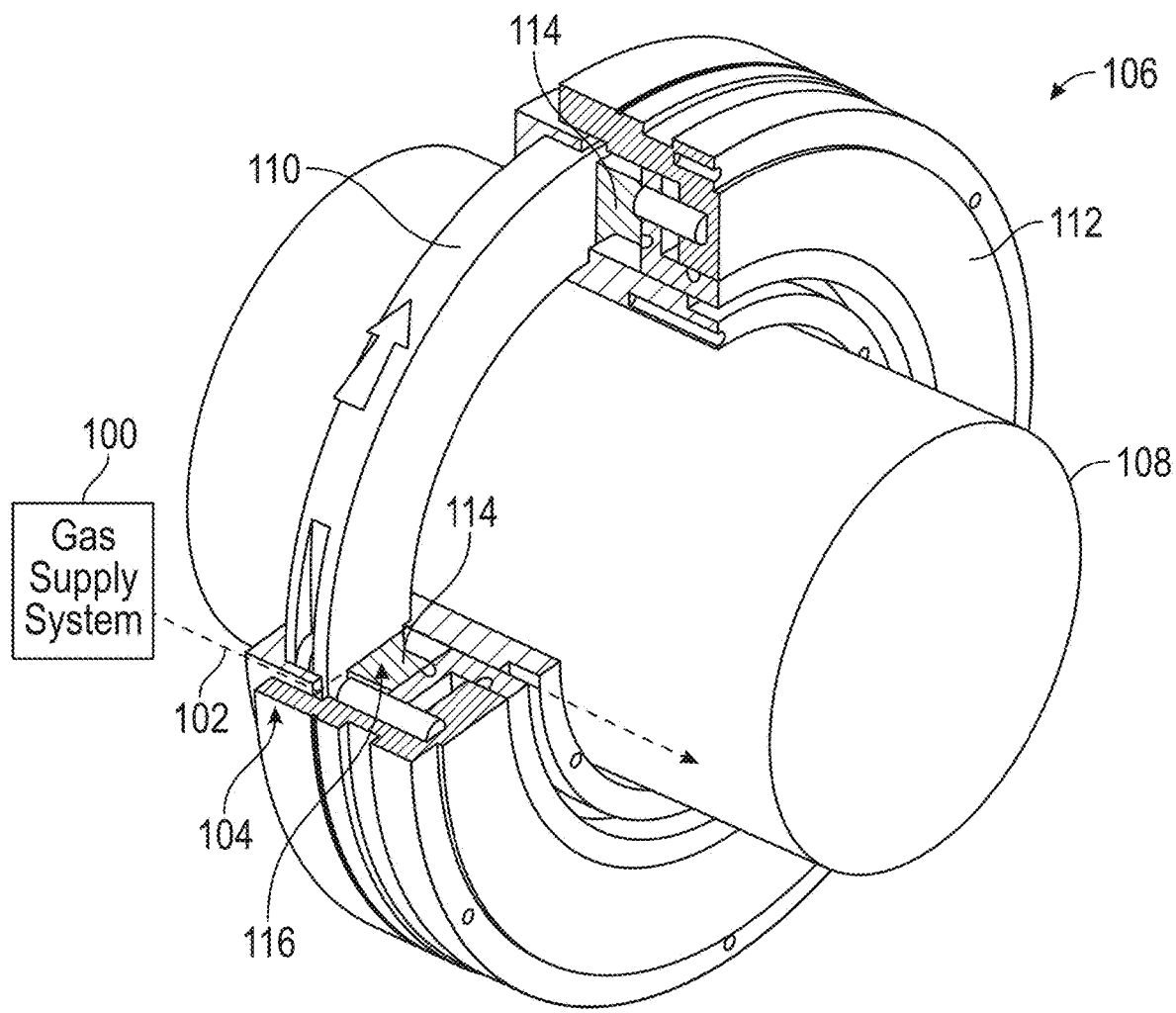
FIG. 1 shows a gas supply system (100) providing seal gas (102) to create a gas seal (104) in a rotating apparatus (106) in accordance with one or more embodiments.

FIG. 1 shows a gas supply system (100) providing seal gas (102) to create a gas seal (104) in a rotating apparatus (106) in accordance with one or more embodiments. The rotating apparatus (106) depicted in FIG. 1 is shown for example purposes only and any type of equipment that requires a seal between two parts (the two parts being designed to be in relative motion with one another) may be used without departing from the scope of the disclosure herein. For example, the rotating apparatus (106) may be a gas compressor or a fluid pump. Furthermore, there may be one or more sets of rotating/stationary parts within the rotating apparatus (106) that require a gas seal (104) supplied by the seal gas (102) without departing from the scope of the disclosure herein.

The rotating apparatus (106) shown in FIG. 1 has a shaft (108) that is configured to rotate. The shaft (108) may have a circular cross section and may rotate to transmit power and motion from one part of the rotating apparatus (106) to another. The shaft (108) is connected to a rotating ring (110). Specifically, the rotating ring (110) is disposed circumferentially around the shaft (108). The rotating ring (110) is designed to rotate with the shaft (108) and keeps the shaft centered within the rotating apparatus, minimizing impact between the shaft (108) and stationary components.

A housing (112) houses the rotating ring (110) and the shaft (108). In accordance with one or more embodiments, the housing (112) may be made of one or more components that make up the external structure of the rotating apparatus (106). In accordance with other embodiments, the housing (112) may be itself located within the rotating apparatus (106) with a subsequent part (not pictured) may surround the housing (112). Furthermore, the rotating ring (110) may be fully located in the housing (112), but the shaft (108) may only extend through the housing (112) and may have portions located outside of the housing (112). In accordance with one or more embodiments, the rotating ring (110) and the shaft (108) rotate within the housing (112) while the housing (112) remains stationary.

A stationary ring (114) is also disposed within the housing (112) and is located adjacent to, but not touching, the rotating ring (110). The stationary ring (114) is not designed to rotate and is fixed to the housing (112). A gap (116) is created between the rotating ring (110) and the stationary ring (114) as well as between the rotating ring (110) and other portions of the housing (112). This gap (116) may be very thin, but it exists so that the rotating ring (110) is able to rotate within the housing (112) without being quickly worn down due to friction. The gap (116) is where process fluid (not pictured) may escape the rotating apparatus (106). The process fluid may comprise any fluid (liquid or gas) that is being moved through or acted upon by the rotating apparatus (106). It is this gap (116) where the gas seal (104) is created.

Specifically, the seal gas (102) is pumped into this gap (116) at a pressure slightly above intake pressure such that the seal gas (102) within the gap (116) prevents the majority of the process fluid that is being taken in by the rotating apparatus (106) from leaking. The seal gas (102) being pumped into the gap (116) is what creates the gas seal (104). The seal gas (102) flows into the rotating apparatus (106) from the gas supply system (100) to create the gas seal (104). The seal gas (102) is comprised of either a first gas or a second gas, outlined below in FIG. 2.

Figure 2:
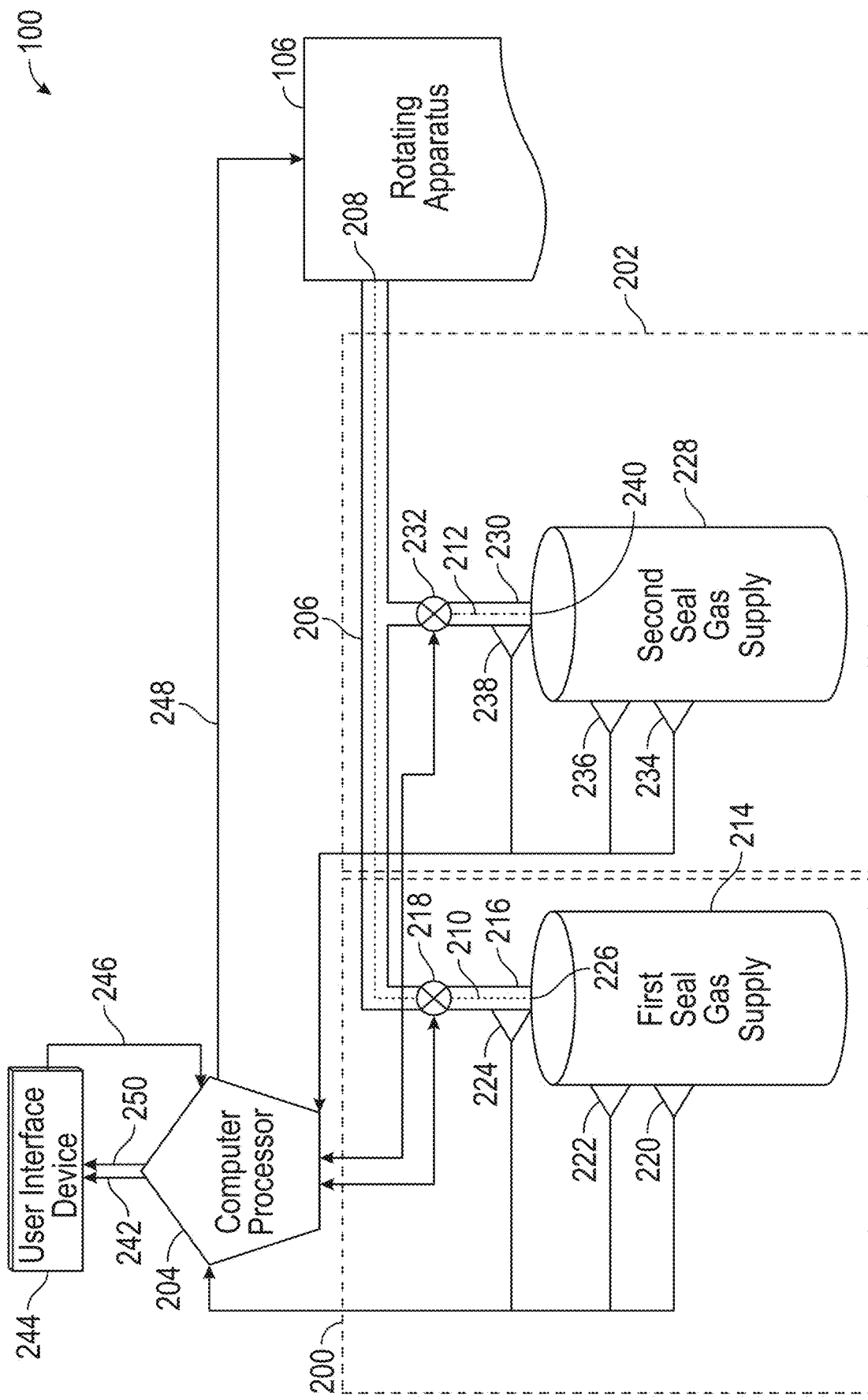
FIG. 2 shows the gas supply system (100) in accordance with one or more embodiments.

FIG. 2 shows the gas supply system (100) in accordance with one or more embodiments. The gas supply system (100) is primarily made up of two subsystems (a first seal gas supply system (200) and a second seal gas supply system (202)), a computer processor (204) (further outlined below in FIG. 5), and a seal gas inlet pipe (206). Components shown in FIG. 2 that are the same as or similar to components shown in FIG. 1 have not been redescribed for purposes of readability and have the same description and function as outlined above.

The seal gas inlet pipe (206) is connected to a seal gas inlet (208) of the rotating apparatus (106) and acts as a conduit to provide the seal gas (102) for the gas seal (104) in the rotating apparatus (106). The seal gas (102) may either comprise a first gas (210) or a second gas (212). FIG. 2 shows the first gas (210) acting as the seal gas (102) for the gas seal (104). This is because the first gas (210) is the gas that is being pumped into the rotating apparatus (106).

The first seal gas supply system (200) is the component of the gas supply system (100) that supplies the first gas (210) to the seal gas inlet pipe (206) to be transported to the rotating apparatus (106). The first seal gas supply system (200) includes, at least, a first seal gas supply (214), a first seal gas supply line (216), a first solenoid valve (218), a first temperature sensor (220), a first contaminate particle count (CPC) sensor (222), and a first pressure sensor (224).

The first seal gas supply (214) houses the first gas (210). The first seal gas supply (214) may be a container that holds the first gas (210), or it may be a source of the first gas (210), such as the exit of a gas purifier, a plant's export pipeline, the plant's fuel gas system, and/or the compressor discharge. The first gas (210) may be any type of gas that is used in dry gas seals, such as nitrogen, carbon dioxide, etc. The first gas (210) is distinguished from the second gas (212) only in that the first gas (210) comes from the first seal gas supply system (200) and not the second seal gas supply system (202). That is, the first gas (210) and the second gas (212) may have the same chemical composition without departing from the scope of the disclosure herein.

The first seal gas supply (214) is coupled to and hydraulically connected to the first seal gas supply line (216). Specifically, the first seal gas supply line (216) is connected to a first seal gas supply outlet (226) located on the first seal gas supply (214). The first gas (210) flows from the first seal gas supply (214) into the first seal gas supply line (216). The first seal gas supply line (216) is a conduit (such as a pipeline or a hose) that is configured to transport the first gas (210) from the first seal gas supply (214) to the seal gas inlet pipe (206).

The first solenoid valve (218) is located somewhere along the first seal gas supply line (216) or on the first seal gas supply outlet (226). The first solenoid valve (218) has an open position and a closed position. FIG. 2 shows the first solenoid valve (218) in the open position. When the first solenoid valve (218) is in the open position, the first gas (210) is able to freely flow from the first seal gas supply (214) to the first seal gas supply line (216), through the first solenoid valve (218), and to the seal gas inlet pipe (206), as shown in FIG. 2. When the first solenoid valve (218) is in the closed position, the first gas (210) is prevented from flowing from the first seal gas supply line (216) to the seal gas inlet pipe (206).

The first solenoid valve (218) is coupled to the computer processor (204). That is, the computer processor (204) may send a signal to the first solenoid valve (218) to actuate the first solenoid valve (218) to place the first solenoid valve (218) in the open position or the closed position. The computer processor (204) may also receive signals from the first solenoid valve (218) that indicates what position the first solenoid valve (218) is in at that particular moment. Specifically, the computer processor (204) may send a signal to energize or de-energize a coil in the first solenoid valve (218) to either place the first solenoid valve (218) in the open position or the closed position.

The first CPC sensor (222) is coupled to the first seal gas supply system (200). The first CPC sensor (222) is shown located on the first seal gas supply (214); however, the first CPC sensor (222) may be located on the first seal gas supply line (216) without departing from the scope of the disclosure herein. The first CPC sensor (222) is configured to measure a particle count in the first gas (210). That is, the first CPC sensor (222) is configured to measure the number of particulates (i.e., solid contaminates) in the first gas (210). In accordance with one or more embodiments, the first CPC sensor (222) may be an optical sensor that can detect the amount of particulates in the measured volume of first gas (210) by detecting a difference in light energy within the first gas (210). The first CPC sensor (222) is used to determine the particulate count in the first gas (210) prior to the first gas (210) entering the first solenoid valve (218).

The first pressure sensor (224) is coupled to the first seal gas supply system (200). The first pressure sensor (224) is shown located on the first seal gas supply line (216); however, the first pressure sensor (224) may be located on the first seal gas supply (214) without departing from the scope of the disclosure herein. The first pressure sensor (224) is configured to measure the pressure of the first gas (210). The first pressure sensor (224) may be any type of pressure sensor known in the art, such as differential pressure flow sensors or a gauge sensor. The first pressure sensor (224) is used to determine the pressure of the first gas (210) prior to the first gas (210) entering the first solenoid valve (218).

The first temperature sensor (220) is coupled to the first seal gas supply system (200). The first temperature sensor (220) is shown located on the first seal gas supply (214); however, the first temperature sensor (220) may be located on the first seal gas supply line (216) without departing from the scope of the disclosure herein. The first temperature sensor (220) is configured to measure the temperature of the first gas (210). The first temperature sensor (220) may be any type of temperature sensor known in the art, such as a thermocouple sensor or a semiconductor-based sensor. The first temperature sensor (220) is used to determine the temperature of the first gas (210) prior to the first gas (210) entering the first solenoid valve (218).

The first CPC sensor (222), the first pressure sensor (224), and the first temperature sensor (220) are each coupled to the computer processor (204). That is, the first CPC sensor (222) may electronically transmit the particle count in the first gas (210) to the computer processor (204), the first pressure sensor (224) may electronically transmit the pressure of the first gas (210) to the computer processor (204), and the first temperature sensor (220) may electronically transmit the temperature of the first gas (210) to the computer processor (204).

The computer processor (204) may include instructions to determine a dew point of the first gas (210) using the measured temperature and pressure settings. In accordance with one or more embodiments, the computer processor (204) will take the measured temperature and pressure settings to calculate the dew point margin ("superheat") using a predefined gas phase map.

The computer processor (204) may also include instructions to monitor the calculated dew point of the first gas (210) and compare the measured temperature of the first gas (210) against the dew point. The computer processor (204) may further include instructions to perform a variety of functions, outlined below, when the measured temperature is within a pre-determined range of the dew point (e.g., between 3-5 degrees Celsius).

The computer processor (204) may also include instructions to monitor the particle count in the first gas (210) and compare the measured particle count of the first gas (210) against a pre-determined value. The computer processor (204) may further include instructions to perform the variety of functions, outlined below, when the measured particle count is above the pre-determined value for a set period of time. The pre-determined value and the set period of time may be any value or time period of time known in the art and depends on the contaminant level and the seal face contaminant tolerance (which varies depending on the seal supplier).

The second seal gas supply system (202) is the component of the gas supply system (100) that supplies the second gas (212) to the seal gas inlet pipe (206) to be transported to the rotating apparatus (106). The second seal gas supply system (202) includes, at least, a second seal gas supply (228), a second seal gas supply line (230), a second solenoid valve (232), a second temperature sensor (234), a second CPC sensor (236), and a second pressure sensor (238).

The second seal gas supply (228) houses the second gas (212). The second seal gas supply (228) may be a container that holds the second gas (212), or it may be a source of the second gas (212), such as the exit of a gas purifier, a plant's export pipeline, the plant's fuel gas system, and/or the compressor discharge. The second gas (212) may be any type of gas that is used in dry gas seals, such as nitrogen, carbon dioxide, etc. The second gas (212) is distinguished from the first gas (210) only in that the second gas (212) comes from the second seal gas supply system (202) and not the first seal gas supply system (200).

The second seal gas supply (228) is coupled to and hydraulically connected to the second seal gas supply line (230). Specifically, the second seal gas supply line (230) is connected to a second seal gas supply outlet (240) located on the second seal gas supply (228). The second gas (212) flows from the second seal gas supply (228) into the second seal gas supply line (230). The second seal gas supply line (230) is a conduit (such as a pipeline or a hose) that is configured to transport the second gas (212) from the second seal gas supply (228) to the seal gas inlet pipe (206).

The second solenoid valve (232) is located somewhere along the second seal gas supply line (230) or on the second seal gas supply outlet (240). The second solenoid valve (232) has an open position and a closed position. FIG. 2 shows the second solenoid valve (232) in the closed position. When the second solenoid valve (232) is in the open position, the second gas (212) is able to freely flow from the second seal gas supply (228) to the second seal gas supply line (230), through the second solenoid valve (232), and to the seal gas inlet pipe (206). When the second solenoid valve (232) is in the closed position, as shown in FIG. 2, the second gas (212) is prevented from flowing from the second seal gas supply line (230) to the seal gas inlet pipe (206).

The second solenoid valve (232) is coupled to the computer processor (204). That is, the computer processor (204) may send a signal to the second solenoid valve (232) to actuate the second solenoid valve (232) to place the second solenoid valve (232) in the open position or the closed position. The computer processor (204) may also receive signals from the second solenoid valve (232) that indicates what position the second solenoid valve (232) is in at that particular moment. Specifically, the computer processor (204) may send a signal to energize or de-energize a coil in the second solenoid valve (232) to either place the second solenoid valve (232) in the open position or the closed position.

The second CPC sensor (236) is coupled to the second seal gas supply system (202). The second CPC sensor (236) is shown located on the second seal gas supply (228); however, the second CPC sensor (236) may be located on the second seal gas supply line (230) without departing from the scope of the disclosure herein. The second CPC sensor (236) is configured to measure a particle count in the second gas (212). That is, the second CPC sensor (236) is configured to measure the number of particulates (i.e., solid contaminates) in the second gas (212). In accordance with one or more embodiments, the second CPC sensor (236) may be an optical sensor that can detect the amount of particulates in the measured volume of second gas (212) by detecting a difference in light energy within the second gas (212). The second CPC sensor (236) is used to determine the particulate count in the second gas (212) prior to the second gas (212) entering the second solenoid valve (232).

The second pressure sensor (238) is coupled to the second seal gas supply system (202). The second pressure sensor (238) is shown located on the second seal gas supply line (230); however, the second pressure sensor (238) may be located on second seal gas supply (228) without departing from the scope of the disclosure herein. The second pressure sensor (238) is configured to measure the pressure of the second gas (212). The second pressure sensor (238) may be any type of pressure sensor known in the art, such as differential pressure flow sensors or a gauge sensor. The second pressure sensor (238) is used to determine the pressure of the second gas (212) prior to the second gas (212) entering the second solenoid valve (232).

The second temperature sensor (234) is coupled to the second seal gas supply system (202). The second temperature sensor (234) is shown located on the second seal gas supply (228); however, the second temperature sensor (234) may be located on the second seal gas supply line (230) without departing from the scope of the disclosure herein. The second temperature sensor (234) is configured to measure the temperature of the second gas (212). The second temperature sensor (234) may be any type of temperature sensor known in the art, such as a thermocouple sensor or a semiconductor-based sensor. The second temperature sensor (234) is used to determine the temperature of the second gas (212) prior to the second gas (212) entering the second solenoid valve (232).

In accordance with one or more embodiments, one or more pumps (not pictured) may be located along the first seal gas supply line (216), the seal gas inlet pipe (206), and/or the second seal gas supply line (230) to pump the seal gas (102) (i.e., the first gas (210) or the second gas (212)) from the seal gas inlet pipe (206) into the rotating apparatus (106) to create the gas seal (104).

The second CPC sensor (236), the second pressure sensor (238), and the second temperature sensor (234) are each coupled to the computer processor (204). That is, the second CPC sensor (236) may electronically transmit the particle count in the second gas (212) to the computer processor (204), the second pressure sensor (238) may electronically transmit the pressure of the second gas (212) to the computer processor (204), and the second temperature sensor (234) may electronically transmit the temperature of the second gas (212) to the computer processor (204).

The computer processor (204) may include instructions to determine a dew point of the second gas (212) using the measured temperature and pressure settings, as outlined above with respect to determining the dew point of the first gas (210). The computer processor (204) may also include instructions to monitor the calculated dew point of the second gas (212) and compare the measured temperature of the second gas (212) against the dew point. The computer processor (204) may further include instructions to perform a variety of functions, outlined below, when the measured temperature is within a pre-determined range of the dew point (e.g., between 3-5 degrees Celsius).

The computer processor (204) may also include instructions to monitor the particle count in the second gas (212) and compare the measured particle count of the second gas (212) against a pre-determined value. The computer processor (204) may further include instructions to perform the variety of functions, outlined below, when the measured particle count is above the pre-determined value for a set period of time. The pre-determined value and the set period of time may be any value or time period of time known in the art and depends on the contaminant level and the seal face contaminant tolerance (which varies depending on the seal supplier).

As outlined above, the computer processor (204) may perform a variety of functions based on determinations the computer processor (204) makes using the data the computer processor (204) receives from the first CPC sensor (222), the first pressure sensor (224), the first temperature sensor (220), the second CPC sensor (236), the second pressure sensor (238), and the second temperature sensor (234).

In accordance with one or more embodiments, the gas supply system (100) may be set up as shown in FIG. 2. That is, the first gas (210) may be acting as the seal gas (102) because the first solenoid valve (218) may be in the open position and the second solenoid valve (232) may be in the closed position. At this point, the first CPC sensor (222), the first temperature sensor (220), and the first pressure sensor (224) may be actively sending readings to the computer processor (204) and the computer processor (204) may be actively determining the dew point of the first gas (210) and comparing the measured temperature of the first gas (210) to the dew point. The computer processor (204) may also be actively comparing the measured particle count of the first gas (210) to the predetermined particle count limit.

When the computer processor (204) determines that the temperature of the first gas (210) is within the pre-determined range of the calculated dew point of the first gas (210) or determines that the particle count of the first gas (210) is higher than the pre-determined value over the pre-determined period of time, the computer processor (204) may perform one or more of the following functions.

The computer processor (204) may send an alert signal (242) to a user interface device (244). The computer processor (204) may send a signal to the first solenoid valve (218) to place the first solenoid valve (218) in a closed position and the computer processor (204) may send a signal to the second solenoid valve (232) to place the second solenoid valve (232) in the open position. Thus, at this point the contaminated gas (i.e., the first gas (210)) is prevented from flowing to the rotating apparatus (106) and the clean gas (i.e., the second gas (212)) is transported to the rotating apparatus (106).

The alert to the user interface device (244) allows the user to understand that the first gas (210) may be contaminated. Thus, the user can investigate and fix the problem. The user may also decide to override the system by sending an override signal (246) to the computer processor (204). Once the computer processor (204) receives the override signal (246), the computer processor (204) may send a signal to re-open the first solenoid valve (218) and close the second solenoid valve (232).

In accordance with one or more embodiments, and when the second solenoid valve (232) is in the open position, the second CPC sensor (236), the second temperature sensor (234), and the second pressure sensor (238) may begin actively sending data to the computer processor (204). A person skilled in the art will appreciate that this data may alternatively be constantly streaming to the computer processor (204), but the computer processor (204) may not begin to actively monitor the data until the second solenoid valve (232) is placed in the open position.

With the second solenoid valve (232) in the open position, the computer processor (204) may be actively determining the dew point of the second gas (212) and comparing the measured temperature of the second gas (212) to the dew point. The computer processor (204) may also be actively comparing the measured particle count of the second gas (212) to the predetermined particle count limit.

If the computer processor (204) determines that the temperature of the second gas (212) gets within the pre-determined range of the calculated dew point of the second gas (212) or determines that the particle count of the second gas (212) is higher than the pre-determined value over the pre-determined period of time the computer processor (204) may perform one or more of the following functions.

The computer processor (204) may send the alert signal (242) to the user interface device (244). The computer processor (204) may send a signal to the second solenoid valve (232) to place the second solenoid valve (232) in a closed position and the computer processor (204) may send a signal to the first solenoid valve (218) to open the first solenoid valve (218). Thus, at this point the contaminated gas (i.e., the second gas (212)) is prevented from flowing to the rotating apparatus (106) and the clean gas (i.e., the first gas (210), if the user has fixed the issue) is transported to the rotating apparatus (106).

In accordance with one or more embodiments, the computer processor (204) may send a display signal (250) to the user interface device (244), such that the particle count, the temperature data, and the pressure data of the first gas (210) and the second gas (212), are displayed in the display (300). The display signal (250) may be sent to the user interface device (244) consistently or periodically. This allows a user to manually monitor the particle count, the temperature data, and the pressure data of the first gas (210) and the second gas (212) if desired.

The above process may occur over and over again, allowing only clean gas (i.e., gas that fits the pre-set standards) to flow to the rotating apparatus (106) to create the gas seal (104). A person skilled in the art will appreciate that the system may alternatively set up with the first solenoid valve (218) in the closed position and the second solenoid valve (232) in the open position without departing from the scope of the disclosure herein.

Figure 3:
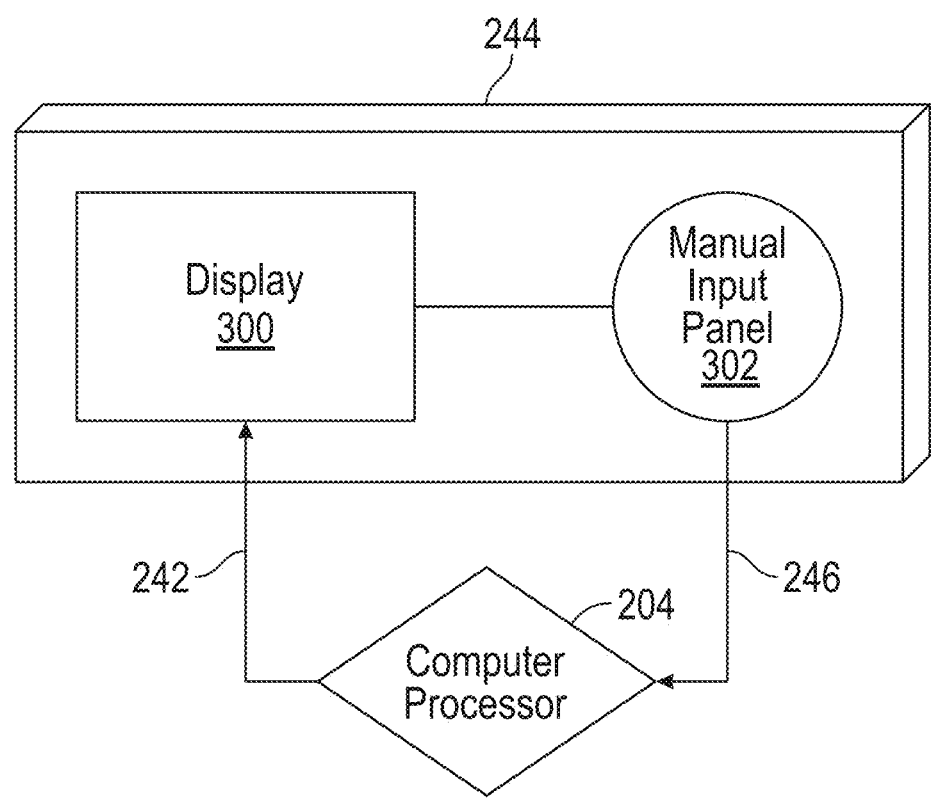
FIG. 3 shows the user interface device (244) in accordance with one or more embodiments.

FIG. 3 shows the user interface device (244) in accordance with one or more embodiments. Components shown in FIG. 3 that are the same as or similar to components shown in FIGS. 1 and 2 have not been redescribed for purposes of readability and have the same description and function as outlined above.

The user interface device (244) has, at least, a display (300) and a manual input panel (302). In accordance with one or more embodiments, when the computer processor (204) sends the alert signal (242) to the user interface device (244), the display (300) may show the alert signal (242) so that a user can see be notified of the computer processor's actions. The alert signal may be displayed on the display (300) as a message, a sound, a visual indication, or any combination thereof.

When the user wants to send the override signal (246) to the computer processor or send any type of command to the computer processor (204) to actuate the first solenoid valve (218) or the second solenoid valve (232) the user may input the message into the user interface device (244) via the manual input panel (302). The user interface device (244) may then send the signal to the computer processor (204).

Figure 4:
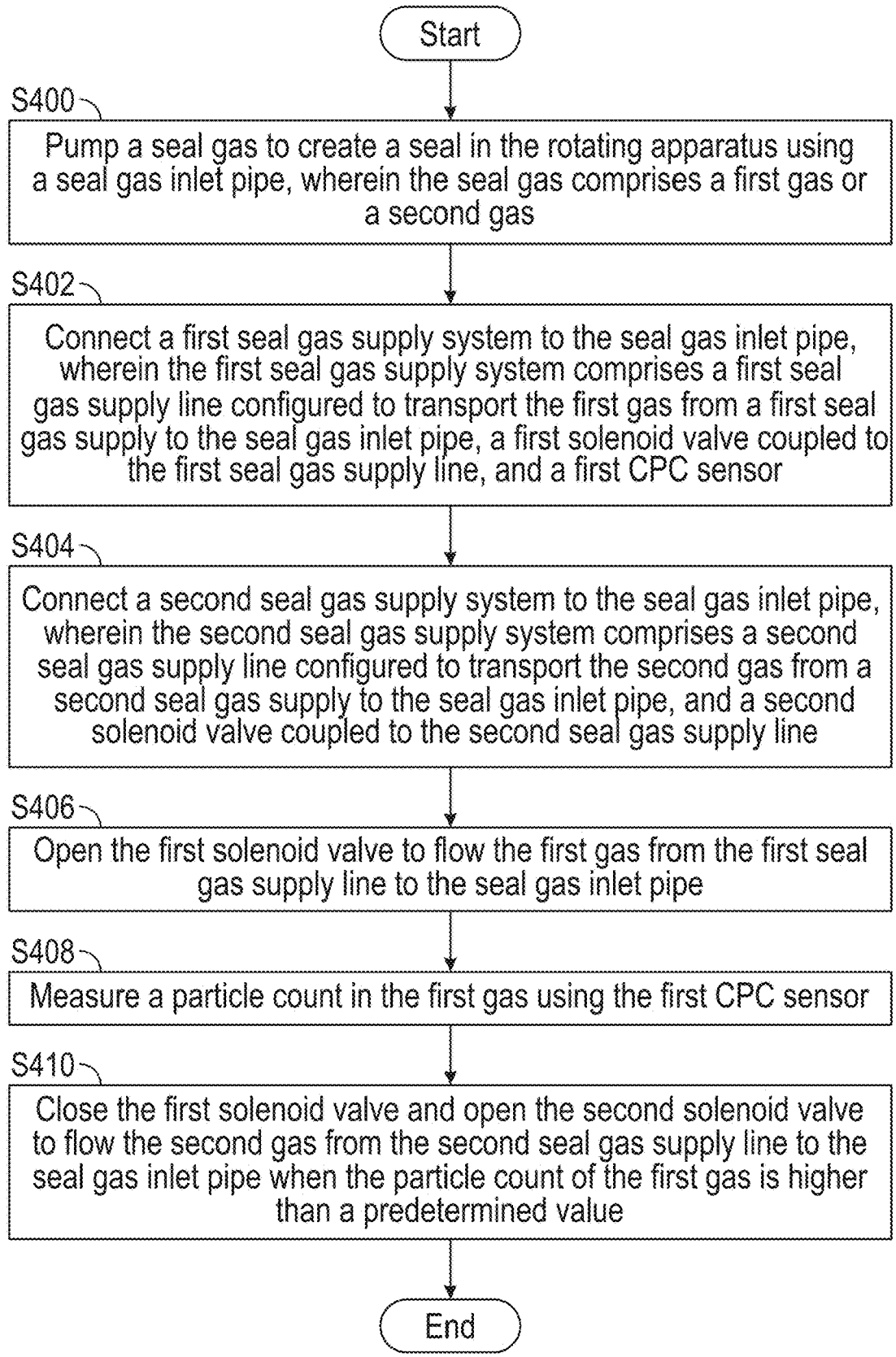
FIG. 4 shows a flowchart in accordance with one or more embodiments.

FIG. 4 shows a flowchart in accordance with one or more embodiments. The flowchart outlines a method for sealing a rotating apparatus (106). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In S400, a seal gas (102) is pumped to create a seal in the rotating apparatus (106) using a seal gas inlet pipe (206), wherein the seal gas (102) comprises a first gas (210) or a second gas (212). In accordance with one or more embodiments, the rotating apparatus (106) comprises a rotating component (e.g., a rotating ring (110) and shaft (108)) and a stationary component (e.g., a stationary ring (114)). The seal gas (102) is pumped into a gap (116) created between the rotating component and the stationary component. The pressure of the seal gas (102) in the gap (116) is such that it seals the gap (116) by preventing the majority of process fluids from escaping from an interior space of the rotating apparatus (106) to an external environment (e.g., the atmosphere).

In S402, a first seal gas supply system (200) is connected to the seal gas inlet pipe (206), wherein the first seal gas supply system (200) comprises a first seal gas supply line (216) configured to transport the first gas (210) from a first seal gas supply (214) to the seal gas inlet pipe (206), a first solenoid valve (218) coupled to the first seal gas supply line (216), and a first CPC sensor (222). The first seal gas supply system (200) further comprises a first pressure sensor (224) and a first temperature sensor (220). The first CPC sensor (222) is configured to measure a particle count in the first gas (210), the first pressure sensor (224) is configured to measure a pressure of the first gas (210), and the first temperature sensor (220) is configured to measure a temperature of the first gas (210).

In accordance with one or more embodiments, the seal gas (102) comprises the first gas (210) when the first seal gas supply system (200) is supplying the first gas (210) to the seal gas inlet pipe (206). Specifically, the first solenoid valve (218) has an open position and a closed position. When the first solenoid valve (218) is in the open position, the first gas (210) is free to flow (or be pumped) from the first seal gas supply (214) to the first seal gas supply line (216) to the seal gas inlet pipe (206) and into the gap (116) in the rotating apparatus (106).

In accordance with one or more embodiments, a computer processor (204) is coupled to the first CPC sensor (222), the first pressure sensor (224), and the first temperature sensor (220). As such, the computer processor (204) can receive the particle count, pressure, and temperature readings from the first CPC sensor (222), the first pressure sensor (224), and the first temperature sensor (220), respectively. The computer processor (204) may be programed with instructions to determine the dew point of the first gas (210) using the pressure and temperature data.

The computer processor (204) may also be programmed with instructions to compare the particle count to a pre-determined value and compare the temperature data to a pre-determined range of the dew point. The computer processor (204) may also be coupled to the first solenoid valve (218). Specifically, the computer processor (204) may be able to receive position readings from the first solenoid valve (218) and may be able to send instructions to the first solenoid valve (218) to place the first solenoid valve (218) in either the open position or the closed position.

In S404, a second seal gas supply system (202) is connected to the seal gas inlet pipe (206), wherein the second seal gas supply system (202) comprises a second seal gas supply line (230) configured to transport the second gas (212) from a second seal gas supply (228) to the seal gas inlet pipe (206), and a second solenoid valve (232) coupled to the second seal gas supply line (230). The second seal gas supply system (202) further comprises a second CPC sensor (236), a second pressure sensor (238), and a second temperature sensor (234). The second CPC sensor (236) is configured to measure a particle count in the second gas (212), the second pressure sensor (238) is configured to measure a pressure of the second gas (212), and the second temperature sensor (234) is configured to measure a temperature of the second gas (212).

In accordance with one or more embodiments, the seal gas (102) comprises the second gas (212) when the second seal gas supply system (202) is supplying the second gas (212) to the seal gas inlet pipe (206). Specifically, the second solenoid valve (232) has an open position and a closed position. When the second solenoid valve (232) is in the open position, the second gas (212) is free to flow (or be pumped) from the second seal gas supply (228) to the second seal gas supply line (230) to the seal gas inlet pipe (206) and into the gap (116) in the rotating apparatus (106).

In accordance with one or more embodiments, a computer processor (204) is coupled to the second CPC sensor (236), the second pressure sensor (238), and the second temperature sensor (234). As such, the computer processor (204) can receive the particle count, pressure, and temperature readings from the second CPC sensor (236), the second pressure sensor (238), and the second temperature sensor (234), respectively. The computer processor (204) may be programed with instructions to determine the dew point of the second gas (212) using the pressure and temperature data.

The computer processor (204) may also be programmed with instructions to compare the particle count to a pre-determined value and compare the temperature data to a pre-determined range of the dew point. The computer processor (204) may also be coupled to the second solenoid valve (232). Specifically, the computer processor (204) may be able to receive position readings from the second solenoid valve (232) and may be able to send instructions to the second solenoid valve (232) to place the second solenoid valve (232) in either the open position or the closed position.

In S406, the first solenoid valve (218) is opened to flow the first gas (210) from the first seal gas supply line (216) to the seal gas inlet pipe (206). In this configuration, the first gas (210) is acting as the seal gas (102) in the rotating apparatus (106). In accordance with one or more embodiments, the first solenoid valve (218) is opened by sending a signal from the computer processor (204) to the first solenoid valve (218).

In S408, a particle count is measured in the first gas (210) using the first CPC sensor (222). In accordance with one or more embodiments, the computer processor (204) receives the particle count and compares the particle count to a predetermined value. If the computer processor (204) determines that the particle count is above the pre-determined value over a predetermined period of time, the computer processor (204) may send an alert signal (242) to a user interface device (244). The user interface device (244) may then alert the user. The computer processor (204) may also send out signals actuating the first solenoid valve (218) and the second solenoid valve (232). In accordance with one or more embodiments, a user may override the computer processor (204) by sending an override signal (246) via a manual input panel (302) on the user interface device (244) to the computer processor (204) to not actuate the solenoid valves.

In S410, the first solenoid valve (218) is closed and the second solenoid valve (232) is opened to flow the second gas (212) from the second seal gas supply line (230) to the seal gas inlet pipe (206) when the particle count of the first gas (210) is higher than a predetermined value. In accordance with one or more embodiments, the computer processor (204) sends a signal to close the first solenoid valve and sends a signal to open the second solenoid valve (232). At this point, the second gas (212) is acting as the seal gas (102) in the rotating apparatus (106).

In accordance with one or more embodiments, the process above is repeated with respect to the second gas (212). Specifically, the computer processor (204) may monitor the particle count, the pressure data, and the temperature data of the second gas (212). If the computer processor (204) determines that the particle count is higher than a predetermined value over a predetermined amount of time, then the computer processor (204) may close the second solenoid valve (232) and open the first solenoid valve (218) to have the first gas (210) act as the seal gas (102) int eh rotating apparatus (106). Alternatively, if the computer processor (204) determines that the temperature of the second gas (212) is within the predetermined range of the calculated dew point, then the computer processor (204) may close the second solenoid valve (232) and open the first solenoid valve (218) to have the first gas (210) act as the seal gas (102) in the rotating apparatus (106).

In accordance with one or more embodiments, the computer processor (204) may monitor the particle count of the first gas (210) and the particle count of the second gas (212), simultaneously. If the computer processor (204) determines that the particle count in the first gas (210) and the particle count in the second gas (212) are both higher than a predetermined value over a predetermined amount of time, then the computer processor (204) may compare the particle count in the first gas (210) to the particle count in the second gas (212).

If the computer processor (204) determines that the particle count in the first gas (210) is higher than the particle count in the second gas (212), then the computer processor (204) may close the first solenoid valve (218) and open the second solenoid valve (232) to have the second gas (212) act as the seal gas (102) in the rotating apparatus (106). If the computer processor (204) determines that the particle count in the first gas (210) is lower than the particle count in the second gas (212), despite both being higher than the predetermined particle count value, then the computer processor (204) may leave the first solenoid valve (218) open so that the first gas (210) remains as the seal gas (102) in the rotating apparatus (106).

Additionally, the computer processor (204) may send the alert signal (242) to the user interface device (244), such that an alert is displayed in the display (300) notifying a user of the contamination of the seal gas (102) in both the first gas (210) and the second gas (212). The alert signal (242) may be displayed on the display (300) as a message, a sound, a visual indication, or any combination thereof.

In accordance with one or more embodiments, the process above is repeated using a combination of the particle count and temperature data. Specifically, the computer processor (204) may monitor the particle count and the temperature data of the first gas (210), and the particle count and the temperature data of the second gas (212), simultaneously.

If the computer processor (204) determines that the temperature of the first gas (210) and the temperature of the second gas (212) are both within the predetermined range of the calculated dew point, then the computer processor (204) may compare the particle count in the first gas (210) to the predetermined particle count value. If the computer processor (204) determines that the particle count in the first gas (210) is higher than the predetermined value, then the computer processor (204) may compare the particle count in the second gas (212) to the predetermined particle count value. If the computer processor (204) determines that the particle count in the second gas (212) is lower than the predetermined value, then the computer processor (204) may close the first solenoid valve (218) and open the second solenoid valve (232) to have the second gas (212) act as the seal gas (102) in the rotating apparatus (106).

If the computer processor (204) determines that the particle count in the second gas (212) is higher than the predetermined value, then the computer processor (204) may compare the particle count in the first gas (210) to the particle count of the second gas (212). If the computer processor (204) determines that the particle count in the first gas (210) is higher than the particle count in the second gas (212), then the computer processor (204) may close the first solenoid valve (218) and open the second solenoid valve (232) to have the second gas (212) act as the seal gas (102) in the rotating apparatus (106).

If the computer processor (204) determines that the particle count in the first gas (210) is lower than the particle count in the second gas (212), despite both being higher than the predetermined particle count value, then the computer processor (204) may leave the first solenoid valve (218) open so that the first gas (210) remains as the seal gas (102) in the rotating apparatus (106). Additionally, the computer processor (204) may send the alert signal (242) to the user interface device (244), such that an alert is displayed in the display (300) notifying a user of the contamination of the seal gas (102). The alert signal may be displayed on the display (300) as a message, a sound, a visual indication, or any combination thereof.

In accordance with one or more embodiments, the computer processor (204) may monitor the particle count, temperature data, and pressure data of the first gas (210) and the particle count, temperature data and pressure data of the second gas (212), simultaneously. If the computer processor (204) determines that the particle count in the first gas (210) and the particle count in the second gas (212) are both higher than a predetermined value over a predetermined amount of time, then the computer processor (204) may send a shutdown signal (248) to shut down the rotating apparatus (106) to avoid seal damage.

Alternatively, if the computer processor (204) determines that the temperature of the first gas (210) and the temperature of the second gas (212) are both within the predetermined range of the calculated dew point, then then the computer processor (204) may send the shutdown signal (248) to shut down the rotating apparatus (106) to avoid seal damage. Also, the computer processor (204) may send the alert signal (242) to the user interface device (244), such that an alert is displayed in the display (300) notifying a user of the computer processor (204) shut down action. The alert signal (242) may be displayed on the display (300) as a message, a sound, a visual indication, or any combination thereof.

Figure 5:
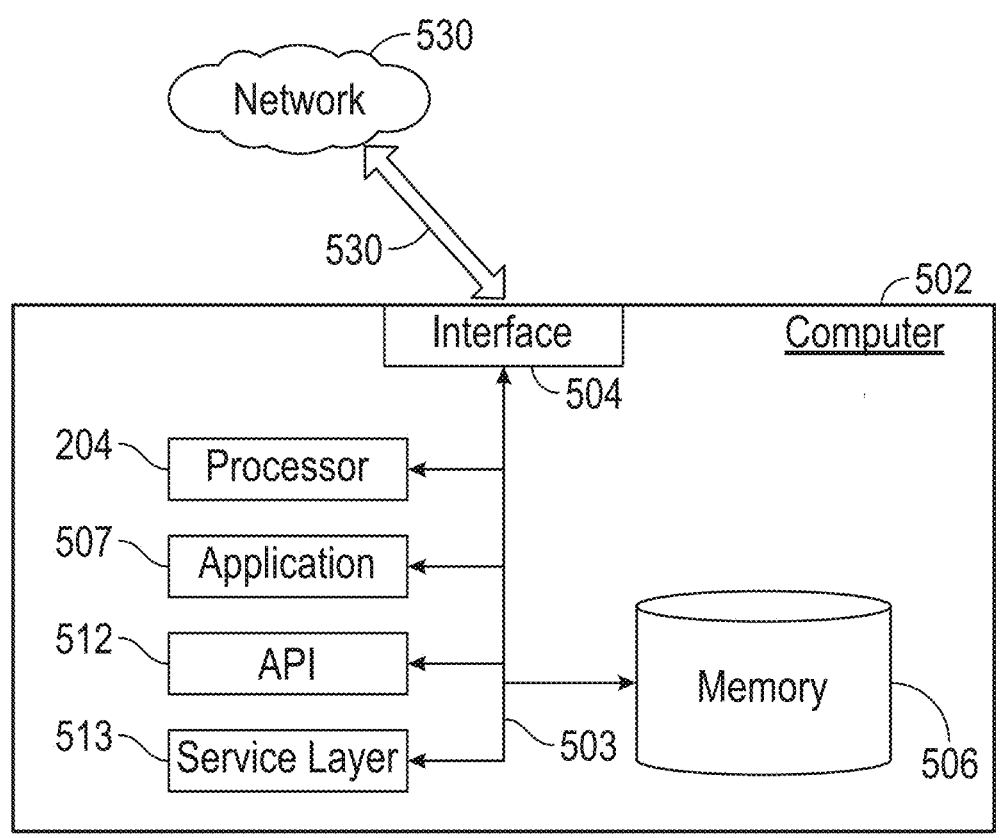
FIG. 5 shows a computer (502) system in accordance with one or more embodiments.

FIG. 5 shows a computer (502) system in accordance with one or more embodiments. Specifically, FIG. 5 shows a block diagram of a computer (502) system used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502).

The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or submodules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (204). Although illustrated as a single computer processor (204) in FIG. 5, two or more processors may be used according to particular needs, desires, or particular implementations of the computer (502). Generally, the computer processor (204) executes instructions and manipulates data to perform the operations of the computer (502) and any algorithms, methods, functions, processes, flows, and procedures as described in the instant disclosure.

The computer (502) also includes a non-transitory computer (502) readable medium, or a memory (506), that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for sealing a rotating apparatus, the system comprising:
   a seal gas configured to create a seal in the rotating apparatus, wherein the seal gas comprises a first gas or a second gas;
   a seal gas inlet pipe configured to transport the seal gas to the rotating apparatus;
   a first seal gas supply system comprising:
      a first seal gas supply line configured to transport the first gas from a first seal gas supply to the seal gas inlet pipe,
      a first solenoid valve coupled to the first seal gas supply line and having an open position and a closed position, wherein the open position hydraulically connects the first seal gas supply line to the seal gas inlet pipe, and
      a first CPC sensor configured to measure a particle count in the first gas, and
   a second seal gas supply system comprising:

a second seal gas supply line configured to transport the second gas from a second seal gas supply to the seal gas inlet pipe, and a second solenoid valve coupled to the second seal gas supply line and having an open position and a closed position, wherein the open position hydraulically connects the second seal gas supply line to the seal gas inlet pipe; and a computer processor coupled to the first CPC sensor, the first solenoid valve, and the second solenoid valve, wherein the computer processor is configured to send a signal to the first solenoid valve to place the first solenoid valve in the closed position and send a signal to the second solenoid valve to place the second solenoid valve in the open position when the first CPC sensor detects the particle count in the first gas being higher than a predetermined value.

2. The system of claim 1, wherein the second seal gas supply system further comprises a second CPC sensor configured to measure a particle count in the second gas.

3. The system of claim 2, wherein the computer processor is configured to send a signal to the first solenoid valve to place the first solenoid valve in the open position and send a signal to the second solenoid valve to place the second solenoid valve in the closed position when the second CPC sensor detects the particle count in the second gas being higher than the predetermined value.

4. The system of claim 1, wherein the first seal gas supply system further comprises a first pressure sensor configured to measure a pressure of the first gas and a first temperature sensor configured to measure a temperature of the first gas.

5. The system of claim 4, wherein the computer processor is coupled to the first pressure sensor and the first temperature sensor and is configured to receive the pressure and the temperature of the first gas and determine a dew point of the first gas.

6. The system of claim 5, wherein the computer processor is configured to send a signal to the first solenoid valve to place the first solenoid valve in the closed position and send a signal to the second solenoid valve to place the second solenoid valve in the open position when the temperature of the first gas is within a predetermined range of the dew point of the first gas.

7. The system of claim 1, wherein the second seal gas supply system further comprises a second pressure sensor configured to measure a pressure of the second gas and a second temperature sensor configured to measure a temperature of the second gas.

8. The system of claim 7, wherein the computer processor is coupled to the second pressure sensor and the second temperature sensor and is configured to receive the pressure and the temperature of the second gas and determine a dew point of the second gas.

9. The system of claim 8, wherein the computer processor is configured to send a signal to the first solenoid valve to place the first solenoid valve in the open position and send a signal to the second solenoid valve to place the second solenoid valve in the closed position when the temperature of the second gas is within a predetermined range of the dew point of the second gas.

10. The system of claim 1, further comprising a user interface device coupled to the computer processor.

11. A method for sealing a rotating apparatus, the method comprising:

pumping a seal gas to create a seal in the rotating apparatus using a seal gas inlet pipe, wherein the seal gas comprises a first gas or a second gas;

connecting a first seal gas supply system to the seal gas inlet pipe, wherein the first seal gas supply system comprises a first seal gas supply line configured to transport the first gas from a first seal gas supply to the seal gas inlet pipe, a first solenoid valve coupled to the first seal gas supply line, and a first CPC sensor;

connecting a second seal gas supply system to the seal gas inlet pipe, wherein the second seal gas supply system comprises a second seal gas supply line configured to transport the second gas from a second seal gas supply to the seal gas inlet pipe, and a second solenoid valve coupled to the second seal gas supply line; and opening the first solenoid valve to flow the first gas from the first seal gas supply line to the seal gas inlet pipe;

measuring a particle count in the first gas using the first CPC sensor; and closing the first solenoid valve and opening the second solenoid valve to flow the second gas from the second seal gas supply line to the seal gas inlet pipe when the particle count of the first gas is higher than a predetermined value.

12. The method of claim 11, further comprising measuring a particle count in the second gas using a second CPC sensor coupled to the second seal gas supply system.

13. The method of claim 12, further comprising closing the second solenoid valve and opening the first solenoid valve to flow the first gas from the first seal gas supply line to the seal gas inlet pipe when the particle count of the second gas is higher than the predetermined value.

14. The method of claim 11, further comprising measuring a pressure of the first gas using a first pressure sensor coupled to the first seal gas supply system and measuring a temperature of the first gas using a first temperature sensor couple to the first seal gas supply system.

15. The method of claim 14, further comprising determining a dew point of the first gas using the pressure and the temperature of the first gas.

16. The method of claim 15, further comprising closing the first solenoid valve and opening the second solenoid valve to flow the second gas from the second seal gas supply line to the seal gas inlet pipe when the temperature of the first gas is within a predetermined range of the dew point of the first gas.

17. The method of claim 11, further comprising measuring a pressure of the second gas using a second pressure sensor coupled to the second seal gas supply system and measuring a temperature of the second gas using a second temperature sensor couple to the second seal gas supply system.

18. The method of claim 17, further comprising determining a dew point of the second gas using the pressure and the temperature of the second gas.

19. The method of claim 18, further comprising closing the second solenoid valve and opening the first solenoid valve to flow the first gas from the first seal gas supply line to the seal gas inlet pipe when the temperature of the second gas is within a predetermined range of the dew point of the second gas.

20. The method of claim 11, wherein closing the first solenoid valve and opening the second solenoid valve further comprises automatically sending a signal to the first solenoid valve to close and sending a signal to the second solenoid valve to open using a computer processor when the computer processor determines the particle count of the first gas is higher than the predetermined value.

* * * * *